United States Patent Office 2,984,543
Patented May 16, 1961

2,984,543
STABILIZATION OF EFFERVESCENT CARBONATE POWDERS

Pierre F. Smith, 460 Cristiani St., Roselle, N.J., and Louis D. King, 67 Lincoln Ave., Newark, N.J.

No Drawing. Filed Mar. 19, 1957, Ser. No. 646,955

4 Claims. (Cl. 23—64)

This invention relates to the modification of the physical properties of finely divided chemical substances which are susceptible of decomposition in the presence of moisture, particularly in the presence of acidic substances and under the influence of elevated temperatures. More particularly, the invention relates to the production of dry, finely divided chemicals which are capable of generating carbon dioxide gas in the form of stabilized particulate products which have value in the production of beverages and medicinal solutions of an effervescing character. The invention provides means for producing such products in improved form as well as products of a novel nature.

Although a great variety of beverages and medicinal solutions utilize carbonation to produce effervescence, or to provide a mild acidic character, the formulation of solid form compositions capable of producing the desired beverages or solutions by simple solution in water has proved a difficult problem. An entire industry, namely the bottling of carbonated beverages, has flourished because of this difficulty. There are many chemical substances of both inorganic and organic character which are capable of generating carbon dioxide in aqueous solution, particularly in the presence of a mild acid, but the difficulty is that these substances present difficult handling, formulation and packaging problems. For example, the carbonates and bicarbonates are highly susceptible to moisture pickup; they lack satisfactory thermal stability; and, in view of these unstable properties, they cannot be premixed with other ingredients, particularly those of acidic character, without decomposition problems. It is an object of our invention to stabilize chemical substances such as carbonates or bicarbonates which are capable of generating carbon dioxide against premature decomposition caused by moisture or moisture vapor pickup, temperature rises, or packaging with acidic substances such as citric or tartaric acids. It is a further object of the invention to produce a stabilized carbonate or bicarbonate which can be readily handled either as a free-flowing powder or a pelleted particulate product for use in formulating beverage and medicinal compositions of the effervescing type, and which can be mixed without premature decomposition with other solid form chemical materials.

The invention provides a process wherein the normally unstable chemical used to generate carbon dioxide in solution, e.g., a carbonate or bicarbonate in finely divided form is impregnated with a mucilage or solution of a hydrophilic natural or synthetic gum. The carbonate may be an inorganic carbonate such as sodium bicarbonate or magnesium carbonate, or it may be an organic carbonate, for example, guanidine carbonate. The gum is preferably a natural or synthetic non-ionic gum of the carbohydrate type. For example, the gum may be a natural gum such as a hemi-cellulose, e.g. guar gum. The impregnation is conducted by intimately mixing the finely divided carbonate or bicarbonate with a solution of the gum, controlling the proportions of carbonate or bicarbonate to gum to use about 0.005 to about 5 weight percent of the gum based on the powder, whereby a thin film of the gum is deposited on the accessible surfaces of the carbonate or bicarbonate. The resulting coated and impregnated mass is dried advantageously under controlled conditions preventing thermal decomposition. The dried product is then reduced to finely divided form, and advantageously is classified to recover as a product the gum coated and impregnated particles in the range of about 10 to 150 mesh. Particles out of this size range have utility, but for most uses, it is better to recycle them for reprocessing. The finished product possesses remarkable stability against decomposition induced by moisture or moisture vapor pickup and by contact with other chemicals, including acidic materials, even in the presence of absorbed moisture or under the influence of hot, humid storage conditions. The resulting granules are free flowing and may be produced in a wide range of size classifications according to the intended end use. If desired, the granules can be compressed into tabletted or pellet form. The resulting product whether in the form of a free flowing powder, larger granules, pills or tablets has been found to have appreciably modified solution characteristics and it is an object of the invention to provide in formulation for controlled solution rates, and hence rates of carbon dioxide evolution, for any beverage or medicinal use.

In the practice of the invention, any of the known carbonates or bicarbonates may be treated to improve stability, solubility properties, or the like. Because of its value in the preparation of effervescing drinks, sodium bicarbonate is of particular interest in the practice of the invention. Other water soluble inorganic carbonates, however, may be treated with value; potassium or lithium bicarbonates or calcium or magnesium carbonates, for example, may be treated according to the method of the invention to produce stabilized carbonate products. In addition to the inorganic carbonate salts, organic carbonates may be treated according to the invention. For example, guanidine, ethylene diamine or hydroxyethylamine carbonates, etc. may be used. Moreover, mixtures of carbonates can be used if desired.

It is an essential criterion of the invention that a water soluble non-ionic gum shall be used to impregnate the carbonate starting material. The gum should be capable of yielding a clear solution when dissolved in water. There are a number of agents which occur in nature and which are known to have the desired properties. Of the available natural gums, it has been found that guar gum has unusual advantages.

The proportions of the gum to carbonate or bicarbonate, as mentioned above, may be in the range of about 0.005 to 5.0 weight percent based on the material treated. With greater advantage the ratio of gum is about 0.5 to 2.0 depending upon the nature of the specific gum and the material to be treated.

The compositions of the invention may be produced by forming a mucilage or solution of the protective gum by dispersing it in water or other volatile solvent. The concentration of the mucilage will depend upon properties of the gum, but ordinarily about 1 to 10 percent of the gum in water is suitable. Care should be taken to insure that complete hydration of the gum takes place and the mucilage may be heated for this purpose. The carbonate or bicarbonate is mixed with the mucilage, and the mixture is agitated to form a homogeneous slurry. The proportions may vary over a considerable range, for example, from about 10–50 parts of mucilage to about 90–50 parts of carbonate or bicarbonate. A proportion of 25 parts of mucilage to 100 parts of carbonate or bicarbonate has been found specially suitable with guar gum. The slurry is dried sufficiently to permit screening the mass through a fine mesh screen. The drying process then may be completed, preferably while avoiding a temperature exceeding about 120° F., since at higher temperatures the decomposition of bicarbonate to carbonate begins to accelerate. The dried and coated particles are then mixed in the desired proportions with other ingredients in the composition and formulation of a variety of products.

It is an advantage of the invention that a great deal of flexible control is provided over the particle or granular size of the finished coated product. The impregnation step, followed by drying and classification step results in a carbonate product which is markedly changed from the starting material. The starting material ordinarily is a fine powder, or something reducible to powder, but in the course of the process larger grains or granules tend to be created. In the classification step, the granules are broken down to the desired size range. It is an advantage of the invention, however, that the size of the granules can be varied in accordance with the desired properties of the product. For example, a product comprising coated and impregnated granules passing through about 30 mesh but retained on say about 60 mesh tends to be relatively slow dissolving compared to a product which passes through 75 mesh or finer. In effervescing drink applications, the result is associated with controlled rate of disintegration and ebullience and stability of the resulting effervescing solutions.

To illustrate by example, a mucilage is prepared in about 2 percent gum concentration and is held at somewhat elevated temperatures, about 100° C., for sufficient time to insure complete hydration of the gum and homogeneous solution. Sodium bicarbonate then is placed in a mixing vessel and the mucilage is added in increments, with thorough mixing. The mixture is partially dried by applying a current of warm air while continuing agitation until the material starts to "ball." The mass then is forced through a 20 mesh wire screen and is placed in a constant temperature, circulating air oven to complete the drying. The drying temperature is maintained at 120° F. maximum temperature, and the average drying time in the oven is about 3 hours.

In test of a number of gums, gelatins and methylcellulose in comparison with guar gum, it was found that the guar-coated samples gave less foaming, less floating of solids on top of the foam and less foam stabilization than those coated with the other gums. The gelatins appeared somewhat less desirable from the standpoint of foam stabilization and showed a relatively slow rate of hydration. The methylcellulose tended to stabilize the foam to a greater extent and hydrated less rapidly than guar. Cellulose-derivatives also appear to be somewhat less readily compatible with other ingredients for use in aqueous solution. The guar-coated bicarbonates were outstanding in properties, and analysis showed that there was substantially no conversion to sodium carbonate during the coating process. After drying, the coated product was found by analysis to contain less moisture than the original bicarbonate.

In another series of experiments, the above procedure was followed using samples of guar mucilage, both freshly prepared without heating and after heating in a water bath for ½ hour to insure complete hydration. The mucilage concentration was 1 percent. It was found that the heated mucilage was superior in producing dispersion of the gum. Although the heating process increased the viscosity of the mucilage, this did not appear to be disadvantageous.

In other experiments, the ratio of mucilage to bicarbonate was varied from 1:3 to 1:5, and a ratio of about 1:3 was found to be most favorable. Also, the drying time was increased from one hour to four hours at 90° F., and then to 1½ hours at 105° F., with only negligible conversion of bicarbonate to carbonate.

The use of the gum-protected bicarbonates has special value in the preparation of effervescing compositions used for making soft drinks. As noted above, the instability of conventional bicarbonate-organic acid carbonating compositions, particularly in the presence of sugar, has prevented the development of satisfactory effervescing compositions in powdered form. Although an effort has been made to overcome the problem by use of fillers and producing the dry formulations in the form of tablets, the resulting products have unsatisfactory solution properties. They are slow dissolving and carbonating, and produce undesirable sediment. Also, they must be very carefully packaged and handled in storage. Although these disadvantages have been tolerated in medicinal compositions because of the intrinsic advantage of the solid form, they have proved unacceptable commercially in the soft drink field.

For use in powdered carbonating mixes, the gum-protected carbonate, e.g., sodium bicarbonate for beverages, or, for example, magnesium carbonate in a medicinal, is admixed with an organic acid such as citric, tartaric, fumaric and/or maleic acid, together with such other ingredients as may be required by the specific formulation. Depending upon their stability, it may be desirable to premix certain of the added ingredients, other than the acids, with the bicarbonate prior to the gum coating stage.

In preparing medicinal products, it may be desirable to have either an excess of bicarbonate or an excess of the acid, depending upon whether an alkaline or acid solution is desired. For preparation of a soft drink effervescing composition, however, it is important to have a ratio of acid to bicarbonate providing a pH in aqueous solution in the range of about 3 to 5. A proportion of sweetener, advantageously, a cyclamate, is added to give the desired degree of sweetness. For example, about 5 to 25 percent by weight of sodium cyclamate, based on the total composition may be used. The sweetness and taste properties in solution may be enhanced if desired by adding about 1 to 25 parts of saccharin to the cyclamate. Also, a small amount of a glutamate may be added to enhance sweetness, e.g., about 1 mg. of sodium glutamate per gram of cyclamate. Such compositions advantageously are flavored with powder flavors, and color may be provided by addition of a soluble dye. Buffering agents, preservatives, and other additives may be added to the mixture in the usual way. A particular advantage of the gum-coated carbonate compositions is that they may be mixed with materials such as vitamin C (ascorbic acid) which are normally inactivated by alkalies. Thus, our invention provides a means for providing a variety of vitamin-fortified soft drink compositions.

The following is an example of a suitable soft drink formulation:

| | Parts |
|---|---|
| Sodium bicarbonate (coated and colored) | 409.8 |
| Citric acid (anhydrous, fine grain) | 837.8 |
| Calcium phosphate (tribasic) | 2.2 |
| Lime flavor powder (Polak Flav-O-Lok) | 4.68 |
| Lemon flavor powder (Polak Flav-O-Lok) | 4.68 |
| Cyclamate sodium | 77.6 |
| Saccharin sodium | 7.76 |

In the above example, the bicarbonate was prepared by slurrying 500 parts of U.S.P. sodium bicarbonate with 133.32 parts of a 1.25% mucilage of guar gum (Jaguar A20A), 0.52 part of F.D. & C. Yellow 5 dye and 0.034 part of F.D. & C. Blue 1 dye, and thereafter drying and granulating.

From the foregoing description and examples, it will now be apparent to those skilled in the art that a variety of potentially useful carbonates can be gum stabilized for use in powdered form. The technique described can be applied with any of the hydrophilic gums forming water or volatile organic solvent solutions. The use of magnesium carbonate in combination with citric acid results in a powdered citrate of magnesia product of great convenience and practicality. The products can be produced as free-flowing granules or can be compressed into tablets.

There is a wide application of the effervescent beverage powder as a medicinal dosage form. Any drug which is water-soluble or which can be water-solubilized can be incorporated into the beverage powder. Those drugs which are water-insoluble and which cannot be made soluble may also be similarly incorporated if they can be rendered dispersible in water or in the resulting drink. For example, aspirin, caffeine, acetanilide, aminopyrine, phenacetin, bromides and various combinations thereof may be incorporated into the beverage powder. Sodium chloride, or sodium chloride and dextrose, may be incorporated in compositions used internally as a first aid treatment for burns or for use in the prevention or treatment of heat fatigue. Sulfonamide drugs, where adequate fluid intake and alkaline buffers are important, may be formulated into carbonated beverage compositions. The incorporation of drugs in effervescing compositions by aid of the gum-protected carbonates of the invention improves the palatability of objectionable drugs. It helps to insure adequate water intake. It may be used to provide an adjustable buffer system, producing the desired pH in the finished drink. Thus, a variety of drugs including: antibiotics, e.g., penicillin or tetracycline; vitamins, barbiturates, salicylates, etc. can be incorporated in dry, free-flowing compositions providing stability in storage and convenience in use.

The gum-coated carbonate has a wide range of applications not limited by the illustrative examples. Where ordinarily bicarbonate is thermally unstable and resists tableting so that it is difficult to stabilize by mechanical means, the gum-coated preparations show excellent storage stability. For example, the stability of the powdered products as prepared in the examples above was checked by storage for nine weeks in containers maintained at 68° F. at varying relative humidity. The product was stable and unspoiled at relative humidities up to 52%. After 12 weeks in an open beaker in an air-conditioned office at 77° F., no evidence of deterioration could be detected. The products are free-flowing and lend themselves to packaging by automatic machinery. Advantageously, the packing conditions should be maintained below about 50% relative humidity and 77° F.

We claim:

1. A process for producing a stabilized free-flowing particle form carbonate product which essentially comprises intimately admixing a finely divided carbonate with a solution containing about 0.005 to about 0.2 weight percent based on the carbonate of guar gum, drying the resulting product, reducing to finely divided form and classifying whereby a dry solid particulate product consisting essentially of the gum impregnated carbonate in the mesh size range of about 30 to 150 and having value in the formulation of effervescing compositions is obtained.

2. A process according to claim 1 wherein the carbonate is sodium bicarbonate.

3. A dried, free-flowing particle form product having value in the formulation of effervescing compositions which consists essentially of a carbonate impregnated with about 0.005 to 2 weight percent of guar gum, wherein the stability of the carbonate against decomposition by moisture pick-up has been enhanced by impregnation with said gum, and which is further characterized by a mesh size range of about 30 to 150.

4. A product according to claim 3 wherein the carbonate is sodium bicarbonate.

References Cited in the file of this patent

UNITED STATES PATENTS

| | | |
|---|---|---|
| 1,150,901 | Strickler | Aug. 24, 1915 |
| 2,312,381 | Bickenheuser | Mar. 2, 1943 |
| 2,372,402 | Stokes | Mar. 27, 1945 |
| 2,540,253 | Gakenheimer | Feb. 6, 1951 |
| 2,803,551 | Helgren | Aug. 20, 1957 |
| 2,868,646 | Schapiro | Jan. 13, 1959 |